United States Patent Office.

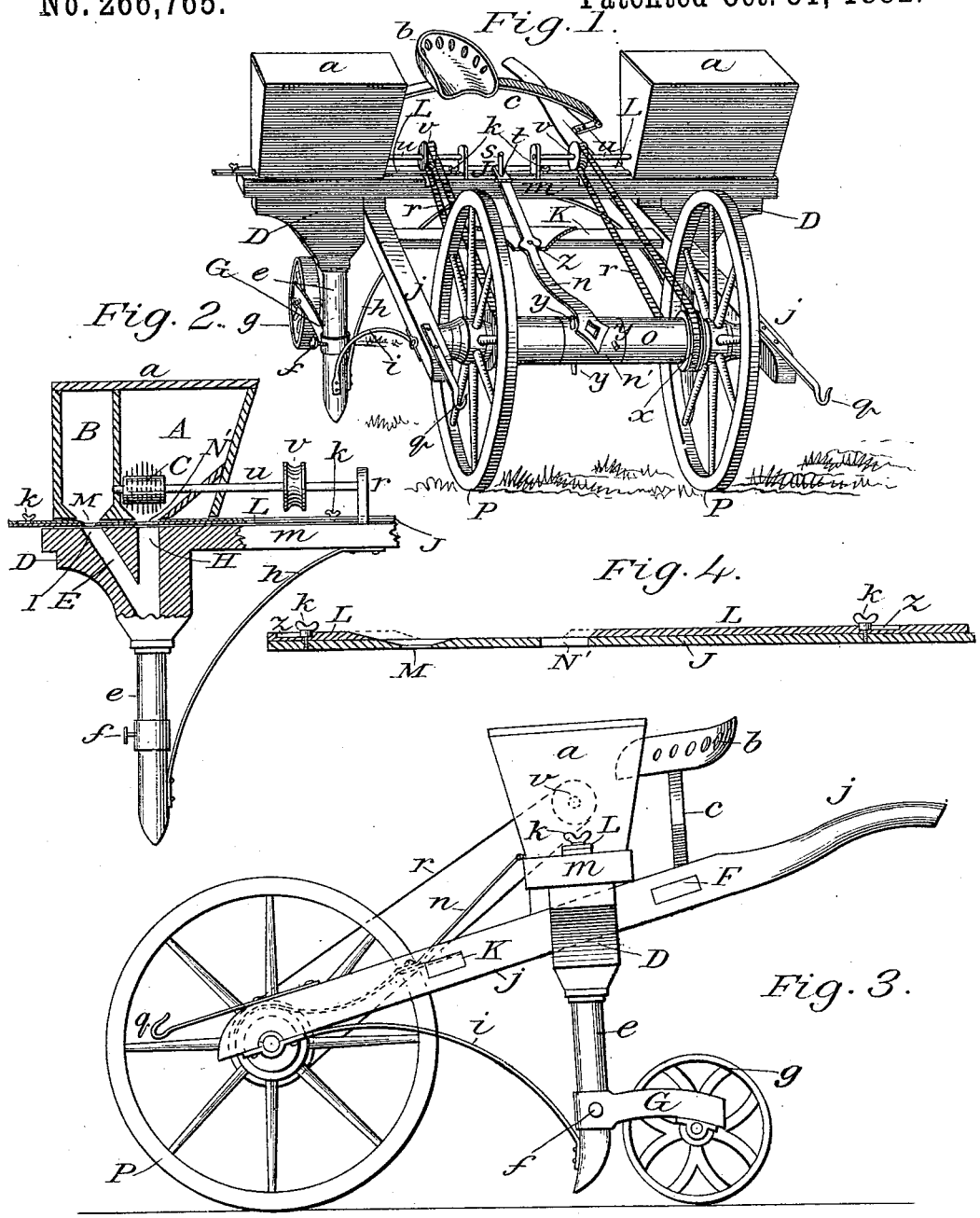

ZEBULON W. BURT, OF ROME, OHIO; (LYDIA ANN BURT, ADMINISTRATRIX OF SAID BURT, DECEASED.)

CORN-PLANTING MACHINE.

SPECIFICATION forming part of Letters Patent No. 266,765, dated October 31, 1882.

Application filed August 19, 1881. (No model.)

*To all whom it may concern:*

Be it known that I, ZEBULON W. BURT, of Rome, in the county of Ashtabula and State of Ohio, have made certain new and useful Improvements in Corn-Planters and Fertilizer-Distributers, of which the following is a full, clear, and exact description, reference being had to the accompanying drawings and letters of reference marked thereon, in which—

Figure 1 is a perspective view of my improved corn-planter and fertilizer-distributer. Fig. 2 is a sectional view of one of the hoppers and seed-tubes. Fig. 3 is a side elevation, and Fig. 4 is a view of the seed-slide and adjusting slides.

My invention relates to improvements in that class of corn-planters and fertilizer-distributers in which the corn and fertilizer are planted in hills instead of drills; and it consists in the peculiar construction and arrangement of the parts, as hereinafter more fully set forth.

In the accompanying drawings, $j\,j$ represent the frame or handles of my improved machine, to the forward ends of which is journaled the axle $o$, carrying the wheels P.

K is a transverse bar connecting the longitudinal sides of the frame, and F is a similar bar which supports the driver's seat $b$, secured to a spring, $c$. The rear end of the frame $j$ is provided with handles, so that the machine may be employed as a riding or walking implement.

$m$ represents a cross-bar secured to the frame $j$, carrying on its upper face, near its opposite ends, the hoppers $a$, each divided by a partition into two compartments—one, A, intended for the reception of a fertilizer, and the other compartment, B, for the reception of corn. The bottom of each of the compartments A B for fertilizers and corn is provided with an orifice.

E represents a bifurcated tube provided with the branches I H, one of which, I, leads obliquely to the orifice in the bottom of the corn-compartment, while the other bifurcation or branch, H, is vertical and forms a continuation of the main tube E, and leads into the orifice in the bottom of the fertilizer-distributer. The bifurcated tube E passes through the cross-bar $m$ and brackets D, secured to the under face thereof, and carries the corn and fertilizer into the tubes $e\,e$, secured to the brackets D, and thence into the hills.

It will be seen that by my construction, because the fertilizer-tube H is shorter (being vertical) than the tube I for conveying the corn, which is oblique and inclined, and because gravity acts on the fertilizer vertically and on the corn obliquely, the fertilizer will fall first into the tube $e$, and thence into the ground, which is the object I desire to obtain, as it is found in practice that the fertilizer should be dropped first into the hill or soil before the grain.

$h\,h$ represent curved braces connecting the seed-tubes $e$ with the transverse bar $m$.

$u$ represents a horizontal shaft provided with a brush or tooth wheel, C, and adapted to revolve just over the orifice in the bottom of the fertilizer-distributer and force the fertilizer down through the tube E into the tube $e$, and thence into the soil. The brush C is made to revolve by means of a pulley, $v$, connected by an endless band, $r$, with the pulley $x$ on the axle $o$, with which it revolves.

J represents a slide-bar adapted to slide on the upper face of the cross-bar $m$ and under the compartments A B. The slide-bar is provided near each end with two openings, M N', for the passage of corn and fertilizer into the seed-tube. The corn-passages M are beveled on the top of their upper ends to prevent the clogging of the corn.

L L represent slides lying over the ends of the slide-bar, and each provided with two holes or slots, $z$, at each end and set-screws $k$, by means of which they can be adjusted on the slide-bar J to vary the feed of the corn and fertilizer as desired.

$n$ represents a lever provided at its lower end with a cam, $n'$, which bears on the axle $o$, and is adapted to be oscillated by a series of pins, $y$, on the outer face of the axle. The forward end of the lever is provided with a clasp or hook, $t$, hinged thereto and engaging with a vertical pin, $s$, secured to the upper face of the slide-bar J. By this construction a reciprocating movement is imparted to the seed-slide, which may be thrown in or out of gear with the lever *n*, when desired, by detaching or attaching the hook *t* to the pin *s*. The draft is applied to the front end of the frame through the hooks *q q*, secured thereto.

To the seed-tubes *e* are pivotally secured the adjustable arms G, carrying at their outer ends the broad iron covering-wheels *g*.

I am aware that a seed-slide having a cam-bar hinged to its outer end and provided with a button, whereby by turning the latter the cam-bar can be thrown up and disengaged, or closed and locked in engagement with a bar connecting the driving-wheels, is old; and I am also aware that a cam bar pivoted at its outer end to a seed-slide has heretofore been provided with a hinge, so that the cam-bar and cam can be raised or lowered at pleasure, so as to operate or not the seed-slide; and I am further aware that an arm hinged to the cam-bar of a corn-planter by a vertical pintle, and provided at its outer end with a slot engaging with a pin secured to the seed-slide, has heretofore been employed, and I therefore lay no claim to such constructions, my invention being confined to the combination of parts pointed out in the claim.

What I claim as my invention, and desire to secure by Letters Patent, is—

The hoppers *a*, slotted seed-slide J, having the pin *s* at its middle, slotted adjustable plates L, and set-screws *z*, in combination with the axle *o*, provided with the pins *y* and cam-rod *n*, pivoted near its middle to the transverse bar *k* of the frame, and provided at its upper end with the hinged slotted clasp *t*, adapted to be opened and closed vertically to engage or disengage the cam-rod from the pin of the seed-slide, when desired, substantially as described.

ZEBULON WILLIAM BURT.

Witnesses:
  NELSON G. HYDE,
  NELSON HYDE.